US009046756B1

(12) United States Patent
Marason et al.

(10) Patent No.: US 9,046,756 B1
(45) Date of Patent: Jun. 2, 2015

(54) DIRECTIVE PROJECTION SCREEN

(71) Applicant: Rawles LLC, Wilmington, DE (US)

(72) Inventors: Eric Gifford Marason, San Francisco, CA (US); William Thomas Weatherford, San Mateo, CA (US)

(73) Assignee: Rawles LLC, Wilmington, DE (US)

( * ) Notice: Subject to any disclaimer, the term of this patent is extended or adjusted under 35 U.S.C. 154(b) by 0 days.

(21) Appl. No.: 14/177,920

(22) Filed: Feb. 11, 2014

Related U.S. Application Data

(63) Continuation of application No. 13/247,080, filed on Sep. 28, 2011, now abandoned.

(51) Int. Cl.
| | |
|---|---|
| *G03B 21/60* | (2014.01) |
| *G02B 27/10* | (2006.01) |
| *G03B 21/602* | (2014.01) |
| *G02B 5/10* | (2006.01) |
| *G02B 6/26* | (2006.01) |
| *G02B 6/32* | (2006.01) |

(52) U.S. Cl.
CPC .............. *G03B 21/602* (2013.01); *G02B 27/10* (2013.01); *G02B 5/10* (2013.01); *G02B 6/26* (2013.01); *G02B 6/32* (2013.01)

(58) Field of Classification Search
CPC ........ G03B 21/602; G02B 27/10; G02B 5/10; G02B 6/26; G02B 6/32
USPC .................................................. 359/459, 449
See application file for complete search history.

(56) References Cited

U.S. PATENT DOCUMENTS

| | | |
|---|---|---|
| 3,704,055 A | 11/1972 | Hong |
| 6,487,349 B2 | 11/2002 | Wach et al. |
| 7,110,176 B2 | 9/2006 | Maruta et al. |
| 7,164,536 B2 | 1/2007 | Whitehead |
| 7,535,636 B2 | 5/2009 | Lippey et al. |
| 7,630,130 B2 | 12/2009 | Yamauchi |
| 7,715,098 B1 | 5/2010 | Sweatt |
| 7,859,750 B2 | 12/2010 | Akiyama |
| 2007/0139765 A1 | 6/2007 | Daniel et al. |
| 2008/0285125 A1 | 11/2008 | Lee et al. |
| 2009/0120594 A1 | 5/2009 | Koster |
| 2010/0067107 A1 | 3/2010 | Akiyama |

FOREIGN PATENT DOCUMENTS

| | | |
|---|---|---|
| CA | 2470138 | 7/2003 |
| WO | WO2008137322 | 11/2008 |

OTHER PUBLICATIONS

Office action for U.S. Appl. No. 13/247,080, mailed on Dec. 18, 2012, Marason et al., "Directive Projection Screen", 7 pages.
Non-Final Office Action for U.S. Appl. No. 13/247,080, mailed on Jun. 22, 2012, Eric G. Marason et al., "Directive Projection Screen", 7 pages.
Pinhanez, "The Everywhere Displays Projector: A Device to Create Ubiquitous Graphical Interfaces", IBM Thomas Watson Research Center, Ubicomp 2001, 18 pages.

*Primary Examiner* — Christopher Mahoney
(74) *Attorney, Agent, or Firm* — Lee & Hayes, PLLC

(57) ABSTRACT

Directive projection screens described herein are configured to selectively direct incident light depending upon an angle of incidence of the light. Such direction improves projection screen gain. Incident light within an acceptance cone is configured to be presented to a viewer. Light outside of the acceptance cone is directed away from the user or absorbed. As a result of this selectivity and the gain, presentation of images on the directive projection screen is improved in the presence of non-projector light sources.

34 Claims, 6 Drawing Sheets

DIRECTIVE PROJECTION SCREEN

PRIORITY

The present application is a continuation of and claims priority to pending U.S. application Ser. No. 13/247,080, filed on Sep. 28, 2011, entitled "Directive Projection Screen", which is incorporated by reference herein in its entirety.

BACKGROUND

A passive display screen is configured to present an image which is projected onto it by a projector. However, passive display screens suffer significant loss of image contrast due to light from non-projector sources such as room lights, daylight from windows, and so forth. As a result, quality of the image presented on existing passive display screens is poor.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Projection systems described herein are used in a variety of environments including movie theaters, conference rooms, classrooms, homes, and so forth. These projection systems include a projector configured to emit light towards a projection surface. The projection surface in turn is configured to accept and scatter the light such that an image is presented to viewers. The projection surface may be fixed, such as one that mounts to a wall or a stand, or portable, such as a handheld projection screen.

Existing projection screens suffer degradation of the presented image resulting from non-projector light sources such as windows letting daylight in, room lights, and so forth. This degradation takes the form of loss of image contrast, which may be visualized as a "washing out" of the image.

Disclosed herein are directive projection screens that provide higher quality images as compared to existing passive projection screens. These directive projection screens are configured such that light from a projector within a predetermined acceptance cone of the projection screen is scattered and reflected for presentation, while light outside of acceptance cone is not reflected to the viewer. Furthermore, the screens described herein provide improved gain of the projected image. As a result, the directive projection screens described herein result in improved contrast and image presentation to viewers.

Illustrative Environment

Figure 1:
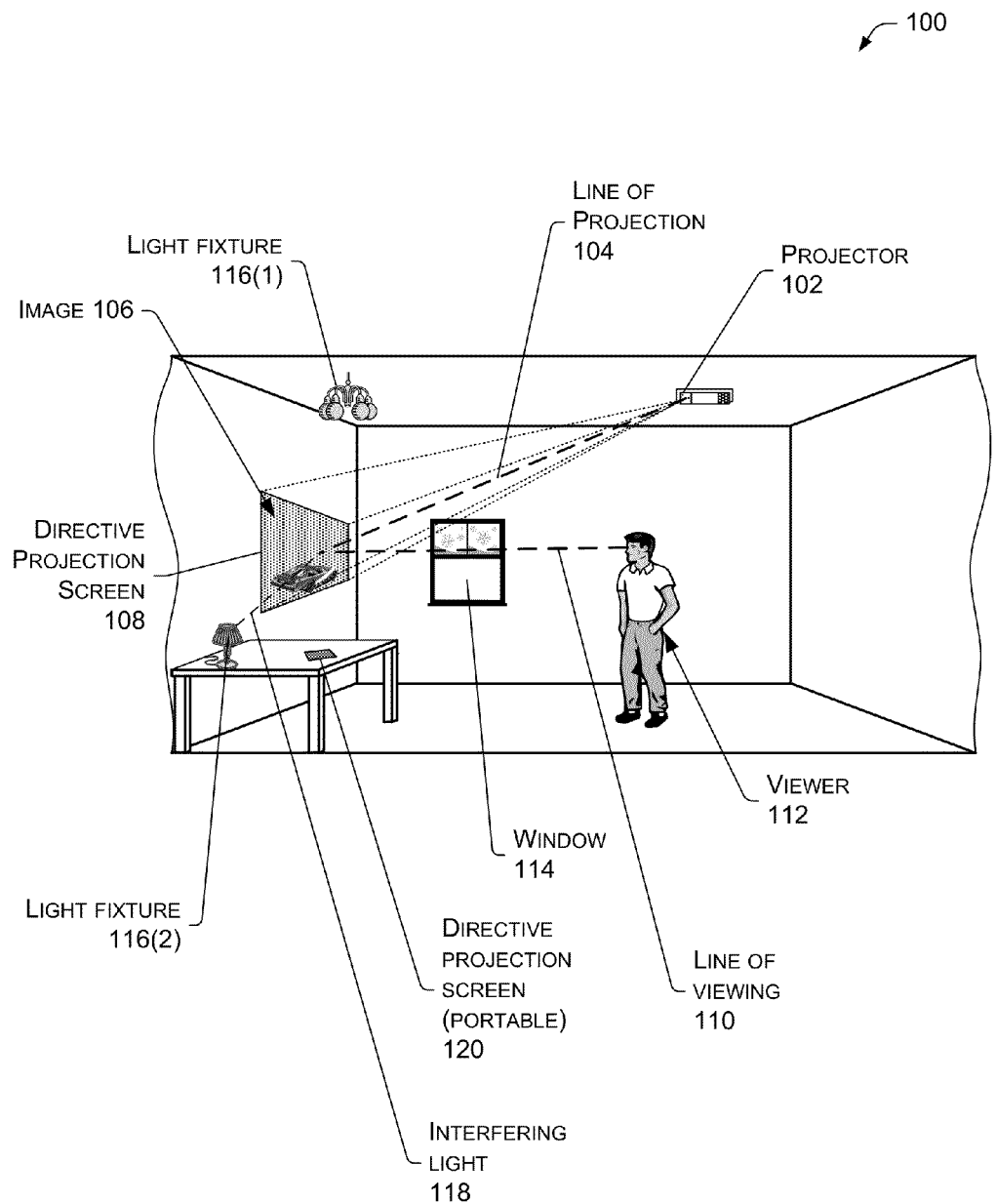
FIG. 1 shows an illustrative scene containing a projector, several non-projector light sources and a directive projection screen.

FIG. 1 shows an illustrative scene 100 in which a directive projection screen may be used. As illustrated, the scene 100 includes a projector 102. This projector 102 may be implemented with any number of technologies capable of generating an image and projecting that image onto a surface within the scene. Suitable technologies include a digital micromirror device (DMD), liquid crystal on silicon display (LCOS), liquid crystal display, 3LCD, laser projector, and so forth. In some implementations, a plurality of projectors 102 may be used.

The projector 102 has a projector field of view which describes a particular solid angle. Along the center of this solid angle may be visualized a line of projection 104 which extends to a center of an image 106. As shown here, the image 106 is presented on a directive projection screen 108 which is mounted on a wall. A line of viewing 110 extends from the image 106 to a viewer 112.

The room may include several non-projector light sources, such as a window 114, an overhead light fixture 116(1), a table lamp light fixture 116(2), and so forth. These non-projector light sources may produce interfering light 118 which impinges upon at least a portion of the directive projection screen 108. As described above, this interfering light 118 may degrade the image 106 such that the presentation to the viewer 112 is unacceptable. The problem of image degradation may be made worse in the case of a portable directive projection screen 120, given that variations in angle and position of the screen relative to interfering light sources may change during use.

In some implementations, a portable directive projection screen 120 may be used. This portable directive projection screen 120 may be carried by a user or otherwise be moved easily around the room. In some implementations, the portable directive projection screen 120 may comprise a structural substrate such as a foam core, plastic sheet, and so forth which has a longest linear dimension when in use of 60 centimeters or less. The weight of the portable directive projection screen 120 may be less than three kilograms in some implementations. The structural substrate may be configured to be rigid, foldable, rollable, and so forth.

The projector 102 may be configured to track this screen 120 during movement within the room and project an image onto it for presentation. For example, text for an electronic book may be projected onto the portable directive projection screen 120 for reading. Tracking may be accomplished by recognizing the shape of the screen 120, following optical targets disposed on the screen, and so forth.

Figure 2:
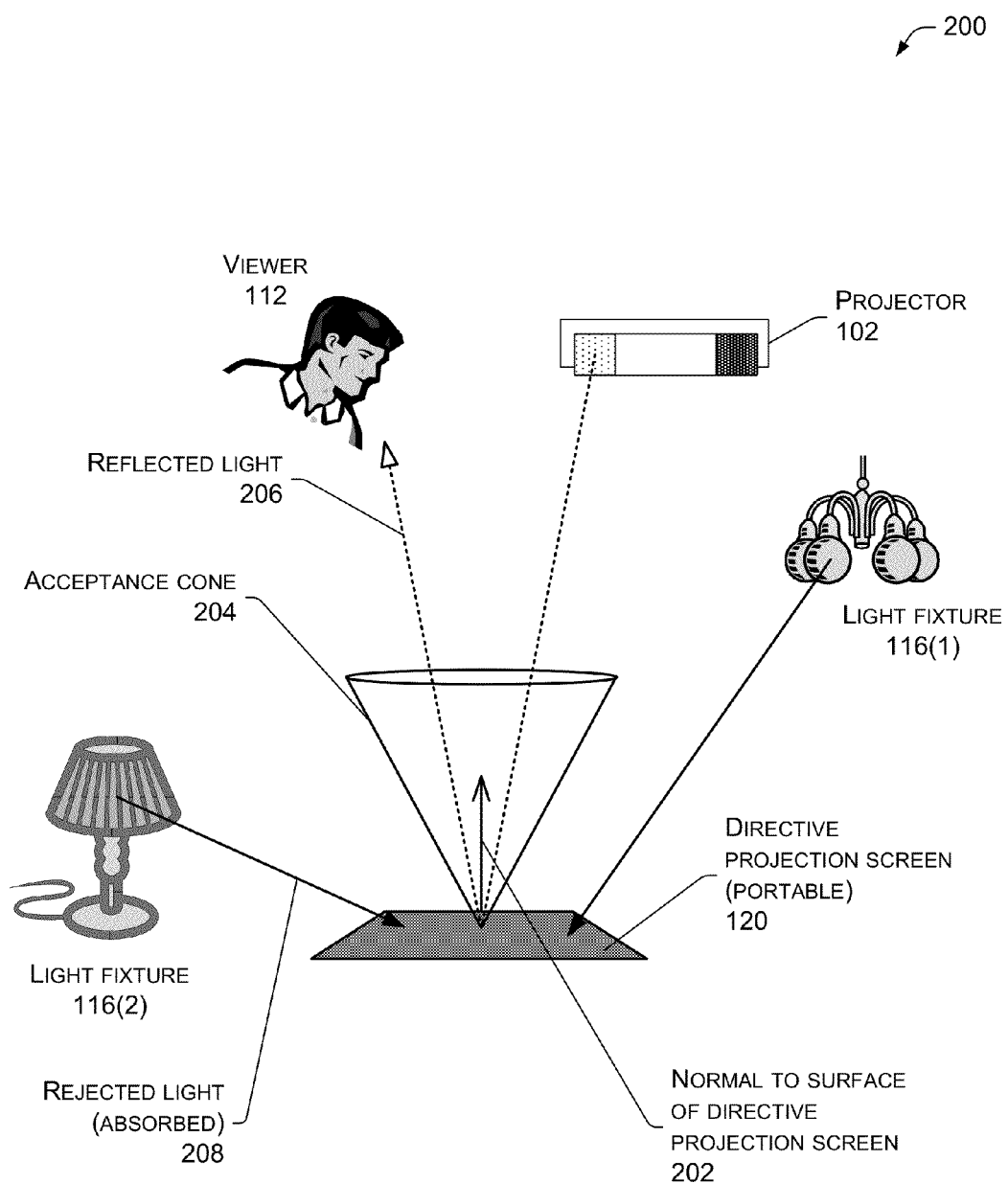
FIG. 2 illustrates an acceptance cone and a viewing cone as well as the reflection and rejection of light impinging on the directive projection screen from different angles.

FIG. 2 illustrates various concepts 200 used in this disclosure. A normal 202 is shown perpendicular or orthogonal to a plane of the directive projection screen, such as the portable screen 120 shown here. An acceptance cone 204 is shown which describes an angle relative to the normal 202. The acceptance cone 204 is the angular range within which incident light will be accepted and reflected 206 generally back towards the viewer 112. For example, as shown here the light from the projector 102 is within the acceptance cone and is thus reflected back 206 to the viewer 112. In some implementations, the acceptance cone 204 may extend 30 degrees from the normal 202. Incident light which is outside the acceptance cone 204 is rejected 208. This rejection may comprise redirection of the light away from the viewer 112, absorption of the light, and so forth. As shown here, light from the light fixtures 116(1) and (2) are outside of the acceptance cone 204, and as a result the otherwise interfering light is rejected 208 by the screen 120.

A viewing cone may describe an angular range in which the viewer 112 is able to view the image 106. In the example above, the acceptance cone 204 and the viewing cone may be coincident.

Figure 3:
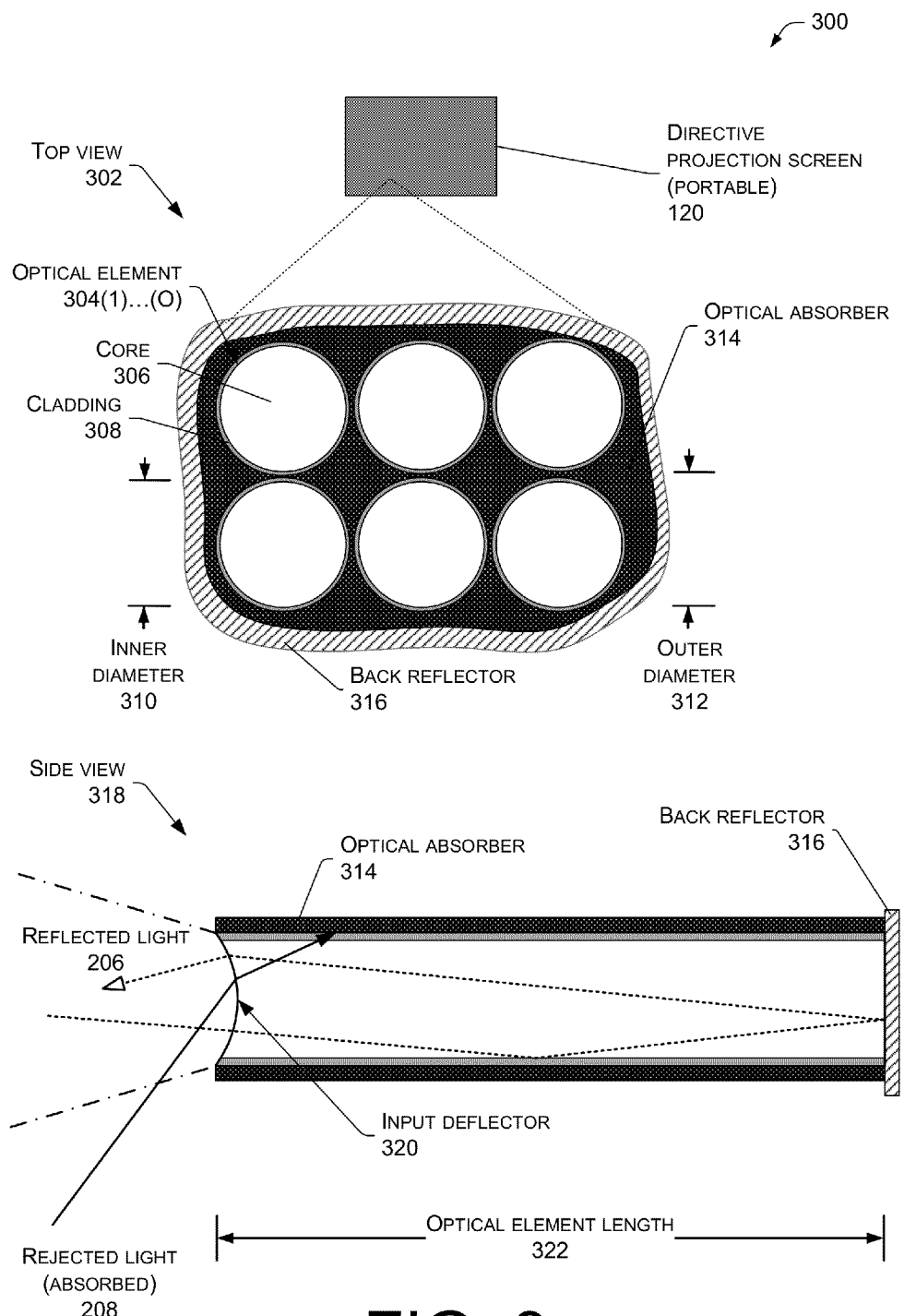
FIG. 3 illustrates an enlarged portion of a directive projection screen comprising optical waveguides.

FIG. 3 illustrates an enlarged portion 300 of the directive projection screen. A top view 302 looks down on a magnified portion of the screen 120, and shows a plurality of optical elements 304(1), 304(2), . . . , 304(O). These optical elements 304 comprise an optical waveguides, including but not limited to optical fibers shown here. These optical fibers comprise a core 306 material surrounded by a cladding 308. The optical fibers may comprise a glass, plastic, crystalline material, and so forth. When the optical elements 304 comprise optical fibers, the refractive index of the core may be about 1.589 while the refractive index of the cladding is about 1.517.

The optical elements 304 may be sized such that their width or diameter is equal to or less than a minimum width of a projected pixel. In the example shown here, an inner diameter 310 of the core 306 may be about 94 microns, while an outer diameter 312 of the cladding 308 may be about 100 microns.

The optical elements 304 may be held in place or distributed within a matrix configured as an optical absorber 314. The optical absorber 314 is configured to be highly absorptive of visible light frequencies. For example, the optical absorber 314 may comprise black glass, carbon black, or a dark pigment. The matrix may aid in maintaining the optical elements in a generally parallel arrangement with one another.

Behind the optical elements 304 is a back reflector 316. This back reflector 316 is optically coupled to the optical elements 304, and is configured to be highly reflective to visible light frequencies. For example, in some implementations the back reflector 316 may comprise a sputtered aluminum mirror. The reflector may be configured to act as a notch filter, reflecting light of particular frequencies. In some implementations, different back reflectors 316 may be configured to act as different optical notch filters for different optical elements 304. These optical notch filters may include a fiber Bragg grating configured to reflect a particular wavelength of light, a plurality of optical interference films having different refractive indices, and so forth.

FIG. 3 also illustrates a side view 318 of one optical element 304. In this view rays of reflected light 206 and rejected light 208 are shown. Light enters the optical element 304 via an input deflector 320 disposed on an entrance or front of the optical element 304. The input deflector 320 is configured to alter a direction of incident light, and prevents an input angle from matching an exit angle. Such alteration expands the viewing cone and improves the angular range relative to the normal 202 within which the viewer 112 may see the image 106. As shown here, the input deflector 320 may comprise a concave feature present in the optical element 304 itself. For example, an optical fiber may be ground or etched to produce the described concavity. The radius of curvature of the concavity of the input deflector 320 may vary. In the implementation shown, the radius of curvature is about 167 microns. In some implementations, the input deflector may comprise a plano-concave lens optically coupled to the front of the optical element 304. In another implementation, a plurality of optically refractive elements may be used, such as glass or plastic beads.

As shown here, the reflected light 206 which is incident on the optical element 304 within the acceptance cone enters the input deflector 320 and undergoes a change in direction. The light continues down the optical element 304 such as by internal reflection, reaches the back reflector 316 which reflects the light back down the optical element 304 for eventual exit. In contrast, light which is incident on the optical element 304 at an extreme angle outside of the acceptance cone enters but fails to transfer down the optical element 304 via internal reflection. As a result, this rejected light 208 is readily absorbed by the optical absorber 314.

An optical element length 322 extends from the front of the optical element 304 to the back reflector 316. In one implementation, the length 322 may be a multiple of about five to ten times the outer diameter 312. In another implementation, the length 322 may be at least ten times the outer diameter 312. The optical element length 322 may vary between optical elements 304 within the screen.

Figure 4:
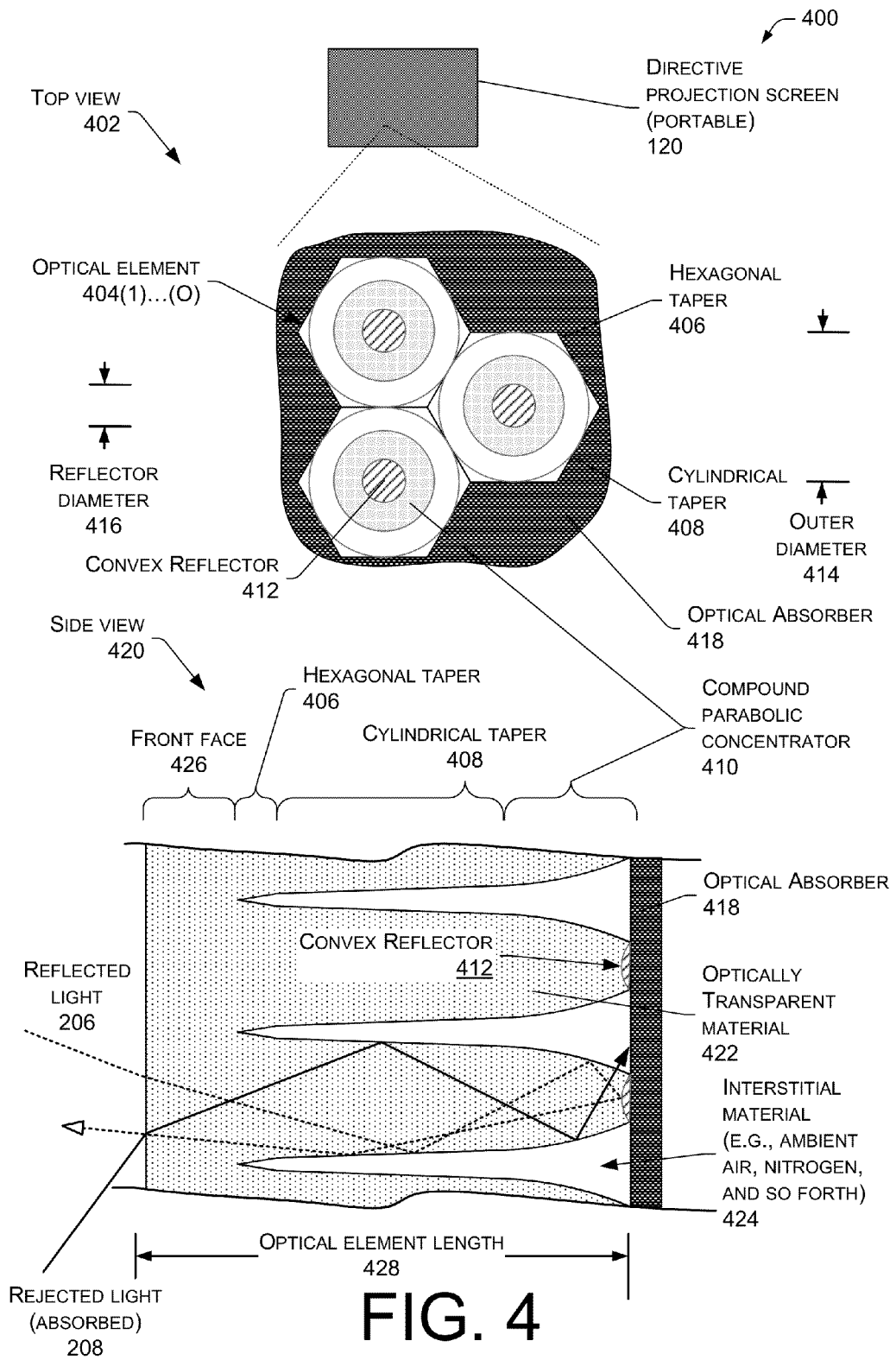
FIG. 4 illustrates an enlarged portion of a directive projection screen comprising an array of tapered optical guides.

FIG. 4 illustrates an enlargement 400 of a portion of a directive projection screen comprising an array of tapered optical guides. A top view 402 shows a plurality of optical elements 404(1), 404(2), . . . , 404(O). These optical elements 404 may comprise a hexagonal taper 406, a cylindrical taper 408, a compound parabolic concentrator 410, and a convex reflector 412. While an initial taper of a hexagon is shown, in other implementations one or more other shapes may be used.

As above, the outer diameter 414 of the optical element is tailored to an expected size of the projected pixels comprising the image 106. For example, the width or outer diameter 414 may be about 100 microns. A reflector diameter 416 may vary according to the arrangement of the compound parabolic concentrator 410. In one implementation, the reflector diameter 416 may be about 36 microns in diameter and have a radius of curvature of about 170 microns. As above, the convex reflector 412 may comprise sputtered aluminum. The reflector may be configured to act as a notch filter which reflects light of particular frequencies. In some implementations, the different reflectors may be configured with different optical notch filters.

Disposed behind the optical elements 404 is an optical absorber 418. The optical absorber 418 is configured to be highly absorptive of visible light frequencies. For example, the optical absorber 418 may comprise carbon black, or a dark pigment.

A side view 420 depicts several optical elements 404. The optical elements 404 are disposed such that they are generally parallel with one another, and perpendicular to a plane of the screen 120 in which they reside. The optical elements 404 comprise an optically transparent material 422. For example, in some implementations a clear flexible silicone elastomer may be used. In other implementations acrylic, other polymers, or glass may be used. Between portions of the optical elements 404 is an interstitial space. This interstitial space may be filled with an interstitial material 424 such as an aerogel, gas, plastic, and so forth. A substantially planar front face 426 is shown at the front of the optical elements 404. The optical elements 404 may be individual elements and discrete from one another, or form sections or groups, such as shown here where the same optically transparent material 422 forms at least four of the optical elements 404 and the front face 426.

The side view 420 shows the transition from the front face 426 having the hexagonal taper 406 with a hexagonal cross section, then to the cylindrical taper 408 having a cylindrical cross section and finally to the compound parabolic concentrator 410 having a cylindrical cross section. Stated another way, from the front face 424 the optical element 404 transitions from a hexagonal prism to a cylinder in the cylindrical taper 408 to the compound parabolic concentrator 410. Within a focal point at a base of the compound parabolic concentrator 410 is the convex reflector 412. The convex reflector 412 is disposed such that the convexity extends towards the front face 426.

As shown here, reflected light 206 is light which is incident within the acceptance cone enters and proceeds through the optically transparent material 422 via internal reflection and is then concentrated via the compound parabolic concentrator 410 onto the convex reflector 412. The convex reflector 412 reflects this light back out, which then leaves the optical element 404 at a different angle compared to an entry angle. As mentioned above, this improves viewability by expanding the viewing cone within which the viewer 112 is able to see the image 106.

In contrast, rejected light 208 enters at an incident angle outside the acceptance cone and exits the optically transparent material 422, may pass through the interstitial material 424, and is absorbed by the optical absorber 418. As a result, light outside of the acceptance cone is effectively rejected, improving the presentation of light from the projector 102 which is within the acceptance cone.

In another implementation, the front face 426 may comprise a separate sheet coupled to the optical elements 404. An optical element length 428 which extends from an outermost edge of the front face 426 to the optical absorber 418 may be between 200 and 500 microns. In some implementations, a linear distance from the front of the hexagonal taper to the optical absorber 418 may be about 300 microns.

In some implementations when the optically transparent material 422 is deformable, the convex reflector 412 may be a surface feature of the optical absorber 418. Upon assembly, the convex reflector 412 may compress at least a portion of a tip of the optically transparent material 422. For example, in one implementation the optical absorber 418 may comprise black acrylic having convex reflector surface features. When assembled with the optical elements 404 comprising flexible silicone, the convex reflector surface features compress the flexible silicone of the optical elements 404. This results in the placement of the convex reflector 412 within the compound parabolic concentrator 410 of the optically transparent material 422.

Figure 5:
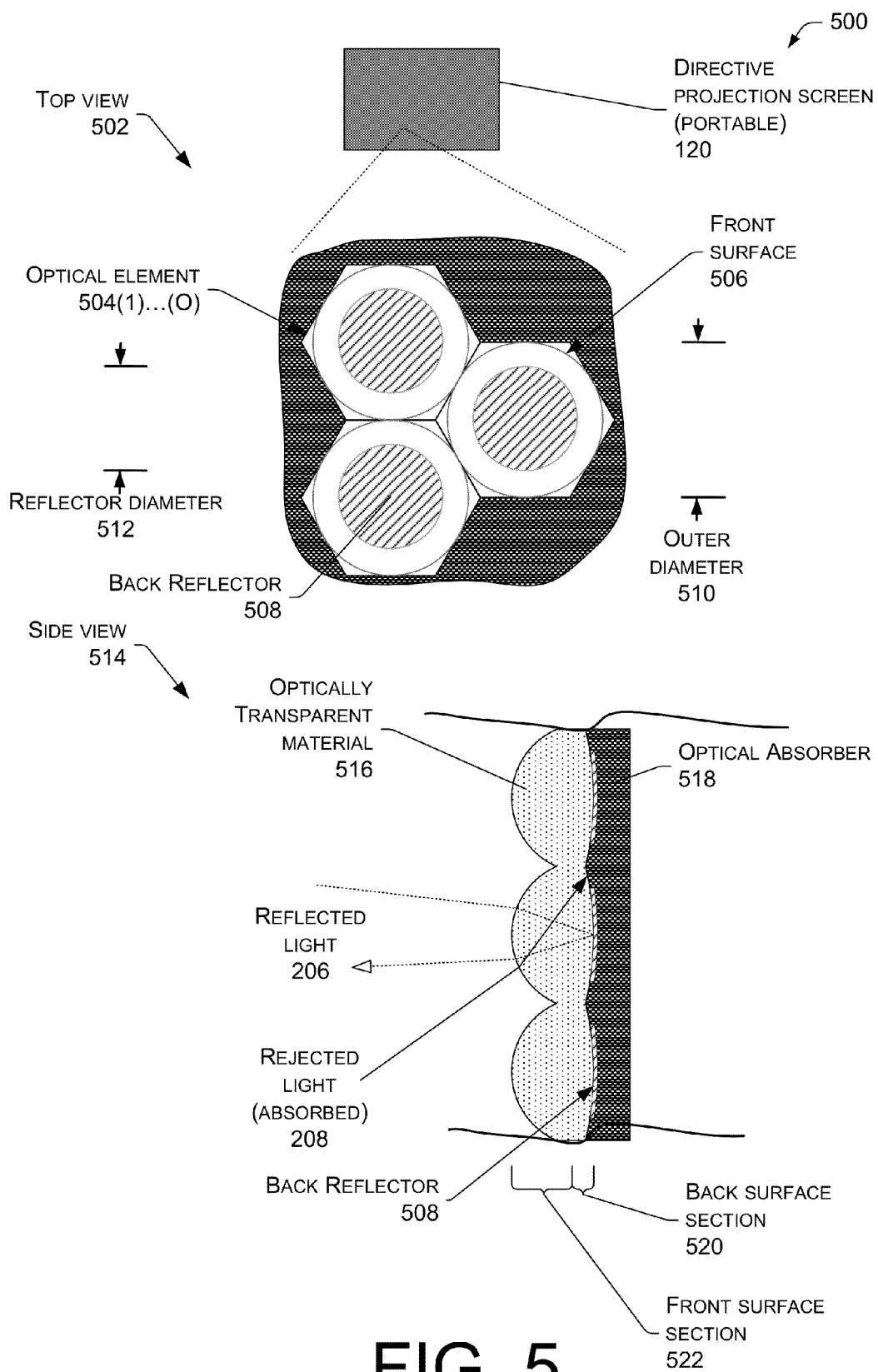
FIG. 5 illustrates an enlarged portion of a directive projection screen comprising an array of convex lenses having front surfaces and back surfaces with back reflectors.

FIG. 5 illustrates an enlargement 500 of a directive projection screen comprising an array of convex lenses having front surfaces and back surfaces with back mirrors. As shown in the top view 502, a plurality of optical elements 504(1), 504(2), . . . , 504(O) are disposed in the projection screen. While a hexagonal packing pattern is shown here, in other implementations other patterns may be used.

The optical elements 504 may comprise a front lens 506, a back lens having about the same diameter, and a back reflector 508 disposed on or proximate to the back lens. These lenses may be spherical, aspherical, or a combination thereof. An outer diameter 510 of the front and back surfaces may be about 100 microns in some implementations. As described above, the outer diameter 510 may be adjusted to correspond to an estimated size of pixels from the projector 102. A reflector diameter 512 is also shown, which is less than the outer diameter 510 of the lenses.

A side view 514 depicts the composition of the optical elements 504. An optically transparent material 516 comprises the optical element 504. For example, in some implementations the optical elements 504 may be formed from a clear silicone material. This may be a single piece of material, or a plurality of pieces bonded together. Behind the optical elements 504 is an optical absorber 518. As described above, the optical absorber 518 is configured to substantially absorb incident visible light.

The optical element 504 may be visualized as a convex back lens section 520 and a convex front lens section 522. The back lens section 522 comprises back surfaces which have a radius of curvature which is greater than a radius of curvature of the front surfaces. For example, the radius of curvature of the front lens may be about 55 microns while a radius of curvature of the back lens may be about 222 microns. These lenses may be spherical or aspherical.

At least a portion of each of the back surfaces is configured with the back reflector 508. For example, as shown here the back reflector 508 is radially symmetrical about an optical axis and is configured with a diameter of about two-thirds the diameter of the back lens. In other implementations, the back reflector 508 may be displaced along the back of the back lens, asymmetrical, or both. Continuing the example above where the outer diameter 510 is about 100 microns, the back reflector 508 may be about 70 microns in diameter.

Disposed behind the back lens section 520 is the optical absorber 518. As above, the optical absorber 518 is configured to be highly absorptive of visible light frequencies. For example, the optical absorber 518 may comprise carbon black, or a dark pigment. In some implementations, the optical absorber 518 and the back reflectors 508 may be incorporated into a single structure. For example, a black plastic sheet acting as the optical absorber 518 may be coated with sputtered aluminum in particular spots to form the back reflectors 508.

As shown here reflected light 206 is incident within the acceptance cone, enters the optically transparent material 516 and is reflected back from the back reflector 508. In contrast, the rejected light 208 which is outside the acceptance cone enters the optically transparent material 516 and is directed into the optical absorber 518.

Figure 6:
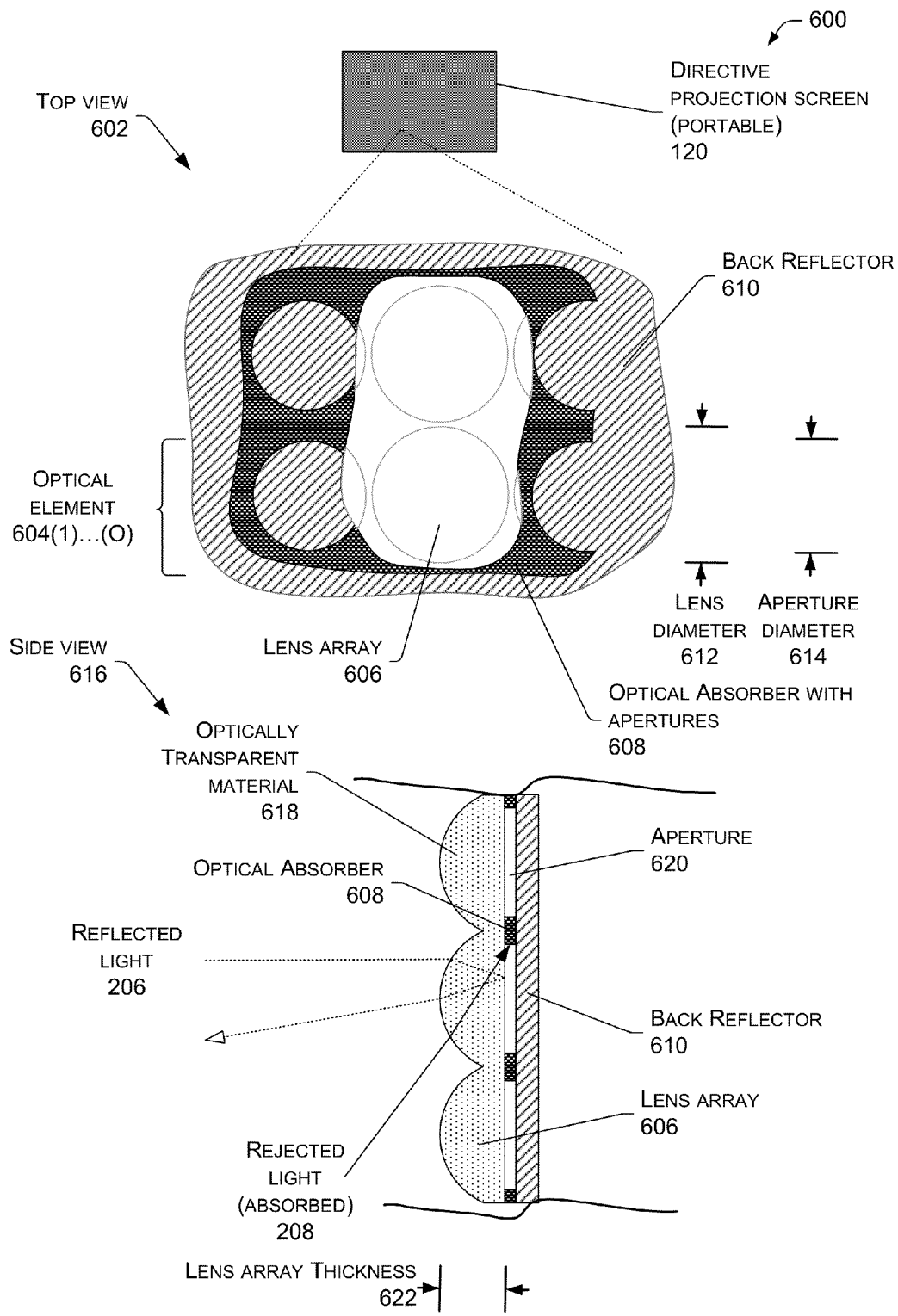
FIG. 6 illustrates an enlarged portion of a directive projection screen comprising a convex lens array with an optical absorber having apertures and back reflectors.

FIG. 6 illustrates an enlargement 600 of a directive projection screen comprising a plano-convex lens array with an optical absorber having apertures and a back mirror. As shown here in a top view 602, the screen comprises a plurality of optical elements 604(1), 604(2), . . . , 604(O). These optical elements 604 comprise a lens array 606, an optical absorber with apertures 608, and a back reflector 610. Lenses in the lens array 606 may be spherical or aspherical and plano-convex in profile, having a convex side and a planar side. The optical absorber 608 comprise a material configures to substantially absorb incident visible light frequencies, as described above. The back reflector 610 is configured to substantially reflect incident visible light frequencies. For example, the back reflector 610 may comprise aluminum. In some implementations, the optical absorber 608 and the back reflector 610 may be combined. For example, the optical absorber 608 may be printed on the back reflector 610.

As shown here, a lens diameter 612 is shown, along with a corresponding aperture diameter 614 which is less than the lens diameter 612. In other implementations the diameters may be about the same.

A side view 616 shows the lens array 606 comprising an optically transparent material 618 such as glass, plastic, and so forth. Behind the lens array 606 is the optical absorber 608 with apertures 620. The apertures 620 may be substantially aligned with the lenses, or offset to alter the acceptance cone, viewing cone, or both. As shown here, the reflected light 206 enters within the acceptance cone and is reflected by the back reflector 610. In contrast, the rejected light 208 is diverted into the optical absorber 608.

A thickness 622 of the lens array 606 is shown here. When the optically transparent material 618 of the lens array 606 comprises plastic, the thickness 622 of the lens array may be about 1.5 times a radius of curvature of the plano-convex lenses. In another implementation, the thickness 622 of the lens array may be equal to or less than one-half of a lens focal length.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. A device comprising:
a plurality of optical elements comprising optical waveguides arranged substantially parallel with one another and within a matrix configured to substantially absorb light incident on the matrix, each optical waveguide having a first end and a second end opposite from the first end;
a plurality of input deflectors, each of the plurality of input deflectors arranged at a respective first end of each of the optical waveguides and having a concave front surface that is configured to alter a direction of incident light; and
an optically reflective material arranged at the second end of the optical waveguides.

2. The device of claim 1, wherein a diameter of each of the optical waveguides is equal to or less than about 100 microns.

3. The device of claim 1, wherein a diameter of the optical waveguides is equal to or less than a width of a pixel projected by a projector and received by the optical waveguides.

4. The device of claim 1, wherein the optical waveguides comprise an optical fiber comprising a core and a cladding.

5. The device of claim 1, wherein a length of the optical waveguides is at least about ten times an outer diameter of the optical waveguide.

6. The device of claim 1, wherein the matrix comprises black glass, carbon black, or a dark pigment.

7. The device of claim 1, wherein the optically reflective material is configured as an optical notch filter.

8. The device of claim 7, wherein the optical notch filter comprises a plurality of optical interference films having different refractive indices.

9. The device of claim 1, wherein the concave front surface of the plurality of input deflectors alters the direction of incident light by substantially preventing an input angle of the incident light from matching an exit angle of the incident light.

10. The device of claim 1, wherein a portion of at least one of the optical waveguides is configured to internally reflect at least a portion of the incident light within the acceptance cone after the portion of the incident light within the acceptance cone enters the at least one of the optical waveguides.

11. A device comprising:
a portable structural substrate;
an optical absorber configured to substantially absorb incident light mechanically coupled to or integrated with the structural substrate; and
an array of passive optical elements comprising optical waveguides mechanically coupled to or integrated with the structural substrate, the array of passive optical elements optically coupled to the optical absorber such that incident light within a pre-determined acceptance cone is reflected while incident light outside of the pre-determined acceptance cone is absorbed by the optical absorber;
wherein at least one of the array of passive optical elements comprises a respective input deflector having a front surface and a concavity on the front surface.

12. The device of claim 11, the portable structural substrate is configured with a longest linear dimension while in use of equal to or less than about 60 centimeters.

13. The device of claim 11, wherein each of the passive optical elements are configured to have a width of between 30 and 150 microns.

14. The device of claim 11, wherein one or more of the respective input deflectors are arranged to alter the direction of incident light by substantially preventing an input angle of the incident light from matching an exit angle of the incident light.

15. The device of claim 11, wherein the optical absorber comprises black glass or carbon black.

16. The device of claim 11, wherein each passive optical element of the array of passive optical elements comprises an optical fiber having a core and a cladding.

17. The device of claim 11, wherein the passive optical elements of the array of passive optical elements are arranged substantially parallel with one another.

18. The device of claim 17, wherein each passive optical element of the array of passive optical elements comprises an optically reflective material disposed on an end of the respective passive optical element.

19. The device of claim 11, wherein a portion of at least one of the optical waveguide is configured to internally reflect at least a portion of the incident light within the acceptance cone after the portion of the incident light within the acceptance cone enters the at least one of the optical waveguides.

20. A device comprising:
a structural substrate;
an optical absorber configured to substantially absorb incident light coupled to or integrated with the structural substrate; and
an array of passive optical elements coupled to or integrated with the structural substrate, the array of passive optical elements optically coupled to the optical absorber such that incident light within an acceptance cone is reflected while incident light outside of the acceptance cone is absorbed by the optical absorber, at least one of the passive optical elements comprising an optical waveguide, wherein an outside portion of the optical waveguide is configured to internally reflect at least a portion of the incident light within the acceptance cone after the portion enters the optical waveguide.

21. The device of claim 20, the structural substrate is configured with a longest linear dimension while in use of equal to or less than about 60 centimeters.

22. The device of claim 20, wherein each of the passive optical elements are configured to have a width of between 30 and 150 microns.

23. The device of claim 20, wherein the passive optical elements comprise optical fibers having input deflectors.

24. The device of claim 23, wherein the input deflectors comprise one or more of a concavity on a front surface of the optical waveguide, a lens optically coupled to the front of the optical waveguide, or a plurality of optically refractive elements.

25. The device of claim 20, wherein the outside portion of the optical waveguide does not internally reflect at least some of the incident light outside of the acceptance cone after the portion of the incident light outside of the acceptance cone enters the optical waveguide.

26. A device comprising:
a plurality of optical elements comprising optical waveguides arranged substantially parallel with one another and within a matrix configured to substantially absorb light incident on the matrix, each optical waveguide having a first end and a second end opposite from the first end;
a plurality of input deflectors, each of the plurality of input deflectors arranged at a respective first end of each of the optical waveguides and configured to alter a direction of incident light;
an optically reflective material arranged at the second end of the optical waveguides; and
wherein a portion of at least one of the optical waveguides is configured to internally reflect at least a portion of the incident light within the acceptance cone after the portion of the incident light within the acceptance cone enters the optical waveguide.

27. The device of claim 26, wherein a diameter of each of the optical waveguides is equal to or less than about 100 microns.

28. The device of claim 26, wherein a diameter of the optical waveguides is equal to or less than a width of a pixel projected by a projector and received by the optical waveguides.

29. The device of claim 26, wherein the optical waveguides comprise an optical fiber comprising a core and a cladding.

30. The device of claim 26, wherein a length of the optical waveguides is at least about ten times an outer diameter of the optical waveguide.

31. The device of claim 26, wherein the matrix comprises black glass, carbon black, or a dark pigment.

32. The device of claim 26, wherein the optically reflective material is configured as an optical notch filter.

33. The device of claim 32, wherein the optical notch filter comprises a plurality of optical interference films having different refractive indices.

34. The device of claim 26, wherein the outside portion of the optical waveguide does not internally reflect at least some of the incident light outside of the acceptance cone after the portion of the incident light outside of the acceptance cone enters the optical waveguide.

* * * * *